United States Patent
Landolt (10) Patent No.: US 8,195,974 B2
(45) Date of Patent: Jun. 5, 2012

(54) DEVICE AND METHOD FOR SYNCHRONIZING THE STATES OF A PLURALITY OF SEQUENTIAL PROCESSING UNITS

(75) Inventor: Oliver Landolt, Taufkirchen (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 538 days.

(21) Appl. No.: 12/444,952

(22) PCT Filed: Sep. 20, 2007

(86) PCT No.: PCT/EP2007/008207
§ 371 (c)(1), (2), (4) Date: Apr. 9, 2009

(87) PCT Pub. No.: WO2008/043427
PCT Pub. Date: Apr. 17, 2008

(65) Prior Publication Data
US 2010/0011240 A1 Jan. 14, 2010

(30) Foreign Application Priority Data
Oct. 12, 2006 (EP) .................................. 06021435

(51) Int. Cl.
*G06F 1/04* (2006.01)
*G06F 1/12* (2006.01)
(52) U.S. Cl. ........................ 713/503; 713/501
(58) Field of Classification Search ............ 713/500
See application file for complete search history.

(56) References Cited

U.S. PATENT DOCUMENTS

| | | | | |
|---|---|---|---|---|
| 5,101,117 | A * | 3/1992 | Johnson et al. | 327/149 |
| 5,517,147 | A | 5/1996 | Burroughs et al. | |
| 5,663,668 | A * | 9/1997 | Hayashi et al. | 327/156 |
| 5,952,857 | A * | 9/1999 | Suzuki | 327/149 |
| 7,350,095 | B2 * | 3/2008 | Boerstler et al. | 713/500 |
| 7,721,137 | B2 * | 5/2010 | Lin et al. | 713/503 |
| 7,729,459 | B1 * | 6/2010 | Kang et al. | 375/354 |
| 7,730,341 | B1 * | 6/2010 | Solt | 713/400 |
| 7,949,080 | B2 * | 5/2011 | Nakayama et al. | 375/373 |
| 2007/0074061 | A1 * | 3/2007 | Lin et al. | 713/500 |

FOREIGN PATENT DOCUMENTS

| | | |
|---|---|---|
| EP | 1385267 A1 | 1/2004 |
| WO | 02058243 A1 | 7/2002 |

OTHER PUBLICATIONS

International Search Report, PCT/EP2007/008207, May 8, 2008, pp. 1-3.

* cited by examiner

*Primary Examiner* — Ryan Stiglic
(74) *Attorney, Agent, or Firm* — Dittavong Mori & Steiner, P.C.

(57) ABSTRACT

A device for providing a plurality of clock signals from a common clock signal. The device includes an input for receiving the common clock signal, a first clock signal path for providing a first output clock signal on the basis of the common clock signal and a second clock signal path for providing a second output clock signal. The second clock signal path includes a clock processing device for changing a phase of the common clock signal to provide the second clock signal.

28 Claims, 4 Drawing Sheets

DEVICE AND METHOD FOR SYNCHRONIZING THE STATES OF A PLURALITY OF SEQUENTIAL PROCESSING UNITS

CROSS-REFERENCE TO RELATED APPLICATION

The present application claims priority to PCT Application No. PCT/EP2007/008207, filed on Sep. 20, 2007, and European Application No. 06 021 435.0, Filed on Oct. 12, 2006, the entire contents of which are herein incorporated by reference.

BACKGROUND OF THE INVENTION

1. Field of the Invention

The present invention relates to setting the states of multiple sequential processing units into mutually compatible states without resorting to a common reset signal.

2. Discussion of the Background

In order to synchronously operate a plurality of sequential electronic circuits arranged e.g. within an electronic system, all involved circuits must be set into mutually compatible states at some point in time. Provided that all involved circuits update their state under control of a clock signal derived from a common reference clock, their states will remain synchronous ever after.

The need to synchronize the states of multiple circuits arises in particular in communication systems comprising e.g. a transmitter scrambling a data stream by combining the data with a pseudo-random bit stream (PRBS) through an exclusive- or operator e.g. for privacy or other purposes. In order to retrieve the original data, the receiver must generate the same PRBS and combine it with the received scrambled data. If the states of the transmitter PRBS generator and the receiver PRBS generator are not properly synchronized then the descrambler output does not match the original data and reception errors occur.

In the prior art, a number of devices are known which superficially resemble the invention in that they also introduce phase shifting elements in the clock paths of a plurality of sequential processing units for synchronization purposes. The fundamental difference with respect to the invention is that these devices seek to synchronize the times at which the processing units update their states whereas the invention seeks to synchronize the states themselves. Considering the example where the processing units consist of two digital counters, the prior art reviewed below seeks to achieve that both counters increment their count value at exactly the same time (never mind whether the count values are identical or not). By contrast, the invention seeks to ensure that the count values are identical in both counters (never mind whether they update their states at exactly the same time or not) as an alternative to the distribution of a common reset signal for high frequency applications where the reset signal approach is not practical.

In an internal clock signal generation circuit as disclosed in U.S. Pat. No. 5,663,668 B1 a plurality of internal clock signals of different phases are generated based on an external clock signal. The internal clock signals are synchronized with the external clock signal by a PLL circuit. The plurality of internal clock signals are respectively supplied to a plurality of internal circuit blocks. Since the phases of the generated internal clock signals are different the phases of the internal clock signals arriving at the internal circuit blocks can be matched even if delays of the signals between the internal clock signal generation circuit and the plurality of internal circuit blocks are different.

A multiple-phase clock signal generator as disclosed in U.S. Pat. No. 5,517,147 B1 includes a phase-locked loop (PLL) for generating an oscillating signal having a predetermined frequency, a counter driven by the oscillating signal and having a plurality of outputs, and a plurality of combinational logic gates each having a plurality of inputs and an output. Selected ones of the inputs of each combinational logic gate are coupled to selected outputs of the counter to produce, at the output of each combinational logic gate, a clock signal having a particular phase. Different combinations of the outputs of the counter can be used to generate different phases.

In order to enable the adjustment of clock tree delays independently from each other, an apparatus is disclosed in EP 1 385 267 A1 for generating at least one phase-shifted version of a reference clock signal within an integrated circuit having a plurality of blocks which require to be supplied with phase-shifted versions of said reference clock signal. This apparatus comprises a single phase-locked loop receiving the reference clock signal at an input thereof and for generating an adjusted clock signal at an output reference point and a clock tree connected to the output reference point of the phase-locked loop for distributing the adjusted clock signal to a first one of the plurality of blocks. An output node of the clock-tree is connected to a feedback input of the phase-locked loop. At least one additional clock tree connected via at least one delay element to the output reference point of the phase-locked loop for distributing a phase-shifted clock signal to additional ones of the plurality of blocks.

Figure 5:
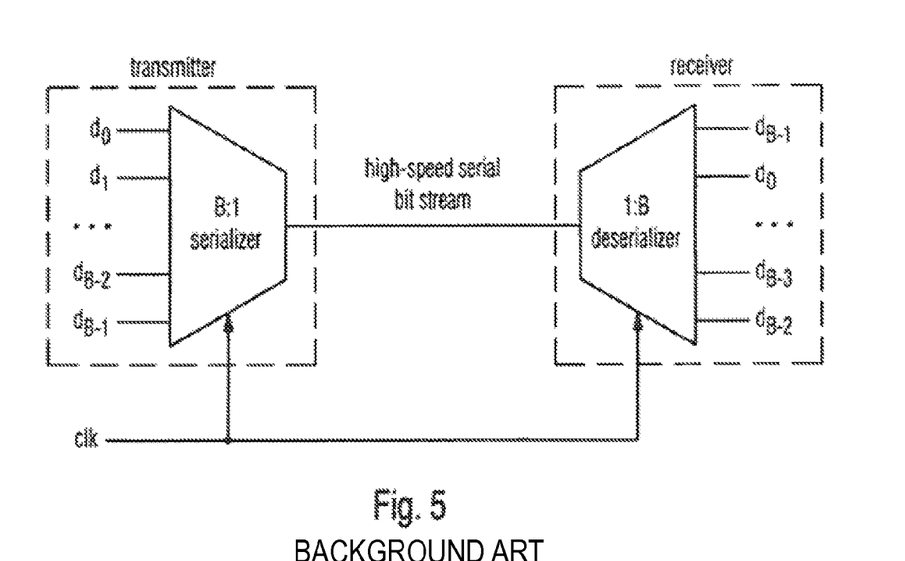
FIG. 5 shows a block diagram of a communication system.

The state synchrony is also required for digital data communications over a single high-speed serial line through serializer/deserializer circuits (SERDES) as depicted in FIG. 5. A transmitter serializes the data incoming as parallel B-bit wide words onto a single high-speed serial bit stream under control of a clock signal. The receiver must sample the bit stream at exactly the same rate as the transmitter clock and at an appropriate phase in order to minimize the probability of transmission errors. Moreover, the states of the deserializer and serializer must also be synchronized in order to recover the original word boundaries. In this case, a synchronization offset between the serializer and deserializer states must be known. If the deserializer begins to operate at a random point in the bit stream then the output words may be shifted with respect to the original words which results in reception errors.

The state synchrony may further be required for circuits arranged within measurement instruments such as digitizing oscilloscopes measuring multiple waveforms simultaneously in the time domain. In order to e.g. display multiple waveforms with correct timing relationships, it is necessary to preserve information about the time at which the samples were acquired by each channel in order to guard against possible latency differences across channels in the subsequent signal clock signal paths.

Figure 6:
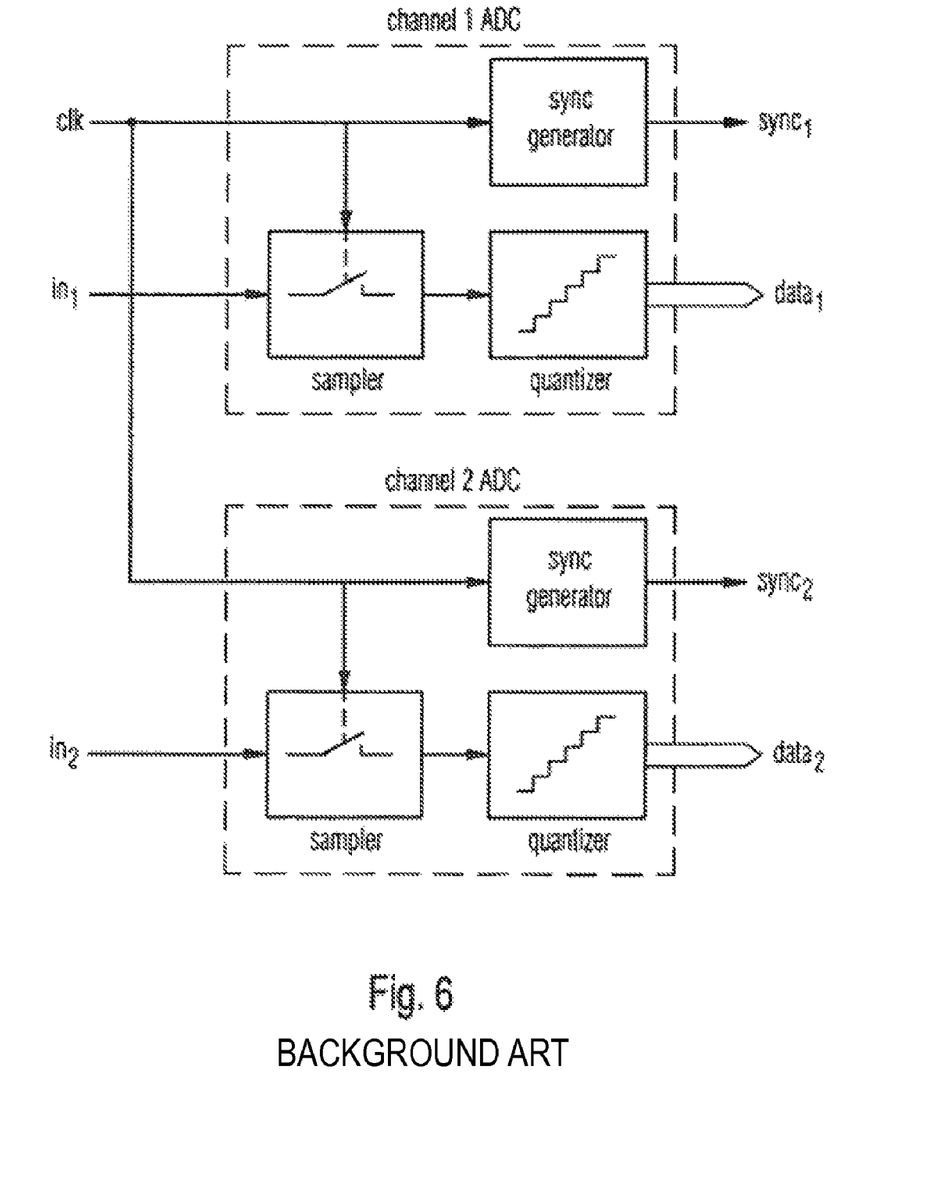
FIG. 6 shows a block diagram of a two-channel measurement system.

For synchronization purposes, a synchronization pattern generator may be incorporated within an analog/digital converter (ADC) of each channel as shown in FIG. 6. The synchronization pattern generator may comprise a periodic pulse generator with a period exceeding the largest expected timing mismatch between the channels. Alternatively, the generator may comprise a counter incrementing a value at every sample time instant. The state of the counter may be output with every sample or at specific times, e.g. with the beginning of an acquisition of a new record. For example, at least once per waveform acquisition, the state of the counter can be recorded into memory along with the digitized sample amplitudes in order to preserve timing information for subsequent time-alignment across channels.

For a proper operation, all channels preferably should sample the input signals at the same frequency and phase relationship. Moreover, the internal states of the synchronization pattern generators should match across the channels so that a timing pattern represents the same time basis for all channels.

In order to operate a plurality of circuits at the same frequency, a common clock signal may be distributed to all circuits as depicted in FIGS. 5 and 6.

At low clock frequencies, the states of a plurality of circuits may further be synchronized by distributing a common reset signal forcing all circuits into a known initial state. After the reset signal is released, the states remain in synchrony provided that the circuits operate on a common clock signal. However, if the distance between circuits is non-negligible compared to the clock wavelength then timing errors exceeding a clock period may occur due to mismatches between the lengths of electrical paths, between the driver characteristics and between the termination impedances.

With reference to FIG. 6 for low-frequency applications, the counters in all ADC chips can be reset to zero at power-up. Thereafter, all counters will hold the same value because they run on the same clock signal. Subsequent to waveform acquisition, data samples measured simultaneously in different channels can be identified in that they are associated to the same counter value.

As an alternative to a common reset signal, it would be possible to let the counters in all ADC chips start from a random initial state. In a first step, it would be necessary to measure the difference between counter states at one point in time. For example, this step could be performed by measuring the same reference signal through both channels of the instrument and comparing the measurement data across channels. Once matching data samples have been identified, the difference between a recorded counter value associated with these samples indicates the amount of offset between the counters. This difference can be cancelled in all subsequent measurements by adding it to the time tags issued by the channel with the lowest counter values. Thus, there is no attempt to modify the states of the counters while they run. Only the recorded data is corrected.

Another approach consists of starting the counters from random initial states and measuring the difference between counters. However, the corrective step consists of incrementally modifying the states of the counters while they run until the two counters reach the same state. Such modification of states may consist of speeding up or slowing down one of the counters temporarily. For instance, the counters may be designed in such a way that they increment by one unit per clock cycle in normal operation, but can optionally increment by zero (in order to slow down) or by two units (in order to speed up) on some clock cycles as a mean to reduce the offset between counters across chips.

A possible approach to ensure synchrony may comprise distributing a common reset signal and asserting it at one point in time in order to reach a known initial state and distributing a common clock signal and making all circuits update their state on transitions of this clock signal.

Another solution for shifting the state of a circuit consists of skipping clock cycles. Upon detection of a state offset, a circuit may let one or more clock cycles go by without updating its own state while other circuits running on the same clock signal keep operating normally. As a result, when this circuit resumes normal operation, its state has been delayed with respect to the states of the other circuits. In principle, clock cycle skipping could be implemented by inserting a cycle skipping circuit in the clock path of an existing circuit and does not necessarily require modifying the internal design of the circuit to be synchronized.

Instead of slowing down the circuit, it would also be possible to speed it up by skipping states compared to the state sequence in normal operation, where a counter increments by two units instead of one. However, this approach requires that the state skipping feature be built into the circuit from the start.

At very high clock frequencies, it may not be practical to distribute a common reset signal to multiple circuits to be synchronized. If the distance between circuits is greater than the wavelength of the clock signal, it may become challenging to achieve good delay matching between the clock signal path and the reset signal path, whereby proper timing relationships between the clock and the reset signals become difficult to guarantee. For this reason, it may be necessary to resort to other means for setting multiple circuits running on the same clock signal into mutually compatible states.

In cases where a distribution of a common reset signal is not feasible, an alternative approach comprises letting all circuits start in random initial states, measuring the offsets between states at one point in time, and correcting the impact of state offsets at all times thereafter.

This approach is suitable for applications where the impact of state offsets, once known, can be corrected. No attempt is made to modify the circuit states themselves while they run. The random initial state offsets remain constant because all circuits run on the same clock signal.

Another possible approach to circumvent the need of a common reset signal consists of:
1. letting all circuits start in random initial states;
2. measuring the offsets between states at one point in time; and
3. modifying the states in some circuits during operation in such a way to obtain mutually compatible states.

Iterations between steps 2 and 3 may be necessary until all circuits have reached mutually compatible states.

A further synchronizing approach is based on transmitting a data stream encoding the state of a circuit with respect to another circuit. This approach is particularly suitable in data communication systems where a data link exists between two circuits to be synchronized. This approach is suitable for synchronizing in the aforementioned scrambler/descrambler-systems where the descrambler automatically recovers the state of the scrambler from the received data bits. However, such a self-synchronizing scheme is suited only for this specific application. It also has the drawback that the scrambler can remain locked in an unwanted state for some incoming data sequences. Thus, scramblers with a large number of state bits must be used in order to reduce the probability of failure which increases the hardware complexity and power consumption.

In order to deal with synchrony errors in high-speed circuits, random initial states may be accepted which requires a posteriori correcting the effect of state misalignment. Referring to the aforementioned SERDES embodiment, a subset of B bits may e.g. be used for transmitting a synchronization pattern marking a word boundary. The receiver deserializes the incoming bit stream starting at a random point and subsequently searches for the synchronization pattern at all possible locations in the B-bit wide parallel output word. A word alignment may be realized by shifting the parallel output words using e.g. a digital barrel shifter. However, the number of logic gates required to implement a B-bit barrel shifter grows with the square of B which is associated with an increasing in hardware complexity and power consumption.

The aforementioned multi-channel measurement instrument demonstrates another case where the effect of random initial states can be corrected a posteriori instead of a priori controlling the states of the circuits. In an initial calibration step performed after a power-up, a suitable common reference signal (e.g. a sine wave or a square wave) can be measured through all channels, wherein the delays between the measurement channels can be calculated from the sample data streams assuming the same original signal. The offsets between the timing patterns across the channels are also calculated. From this information, the relationship between the timing pattern generated by each channel and a common time scale can be determined. As long as the instrument remains powered up, this relationship will remain unchanged. The timing patterns recorded in subsequent measurements can be corrected on this basis which is, however, associated with an increased complexity.

SUMMARY OF THE INVENTION

It is the object of the invention to provide an efficient device and method for synchronizing the states of a plurality of processing units.

This object is achieved by the features of the independent claims. Further developments are defined by the dependent claims.

The invention is based on the first finding that an efficient synchronization of the states of a plurality of preferably sequential processing units may be realized by generating a plurality of clock signals from a common clock signal and by changing a phase of at least one clock signal of the plurality of the clock signals with respect to the common clock signal and/or with respect to another clock signal of the plurality of the clock signals. The invention is further based on the second finding that an effective state synchronization can be made by a feedback control. Thereby, a synchronization error is determined by means for determining a synchronization error that receives an output signal from the first processing unit via a first input and an output signal from the second processing unit via a second input and compares the state of the first processing unit with the state of the second processing unit. An output of the means for determining the synchronization error is fed back to a control input of the clock processing means.

Preferably the means for determining the synchronization error controls the clock processing means in a manner that the clock rate of the second output clock signal is increased or decreased until the second output clock signal is synchronized to the first output clock signal or vice versa, i.e. until the state of the second processing unit matches the state of the first processing unit and vice versa.

Furthermore, the clock processing means is preferably able to insert and/or remove cycles from the common clock signal in order to generate the second output clock signal for the second processing unit. Furthermore the clock processing means is preferably able to shift the phase of a common clock signal by an angle of more than 360° without a phase discontinuity in order to generate a second output clock signal. Another point of view is that a phase rotation over a full 360° turn effectively inserts (or removes, depending on the direction of phase rotation) a clock cycle into (from) the common clock signal. Therefore, the invention can be understood as a means to insert or remove cycles from a common clock signal. The phase rotation must be slow enough that the related processing unit keeps operating properly while the phase is rotated. Thereby, the additional clock cycle is inserted gradually over the time needed to complete the 360° rotation. Provided that the clock processing means is able to rotate the phase over 360° without discontinuity, any number of clock cycles can be inserted or deleted in this way, thereby shifting the state of the second processing unit until it is synchronized with the first processing unit.

Furthermore, the clock processing means is preferably controlled in a manner that the clock processing means shift the phase of the common clock signal in small increments over a range of at least 360° in order to generate the second output clock signal.

For example, a synchrony between multiple circuits may be achieved by inserting a variable delay element in the clock path leading to each circuit. Typically, the delay tuning range extends over only a fraction of the clock period. In this case, this technique only enables fine-tuning the relative phases at which the circuits operate. Theoretically however, the delay tuning range could extend over multiple clock periods. By increasing the delay setting slowly and continuously by one clock period, it would be possible to shift the state of a circuit by one unit with respect to other circuits running on the same clock signal. However, this technique can provide only limited shifting of circuit states because variable delay elements have a finite delay tuning range. Thus, the clock processing means may delay the common clock signal.

According to an aspect, clock cycles may be inserted into or removed from e.g. a periodic clock signal by slowly rotating a phase dial placed in its clock path. Preferably, the clock processing means e.g. programmably rotates the phase of the common clock signal and forms a phase dial. The phase dial may consist of a circuit shifting the phase of the original clock signal by a programmable amount over a 360° range. Preferably, the phase dial provides a quasi-continuously shifting phase over the entire 360° range without a "wrap-around" discontinuity at any point.

According to an aspect, the clock processing means successively changes the phase of the common clock signal by a predetermined phase amount in a plurality of processing steps. In each processing step, the phase of the common clock signal may be changed by e.g. a fractional amount of the predetermined phase amount. The clock processing means may output a clock signal in each processing step as the second clock signal.

According to an aspect, the clock processing means continuously changes the phase of the common clock signal to provide the second clock signal having a different frequency than the common clock signal. In this case, the frequency change is introduced due to the time-dependency of the phase change.

According to an aspect, the first clock signal path comprises a further clock processing means for changing a phase of the common clock signal or of a version thereof to provide the first clock signal. For example, the further clock processing means comprises the features of the clock processing means associated with the second clock signal path.

According to an aspect, the clock processing means and the further clock processing means change the phase of the common clock signal or of the version thereof in opposite directions. For example, the clock processing means changes the phase of the common clock signal (or of a copy thereof) in a positive direction and the further clock processing means changes the phase of the common clock signal (or of a copy thereof) in a negative direction or vice versa.

According to an aspect, the clock processing means may programmably shift the phase of the common clock signal within a range between 0 degree and 360 degree, e.g. without a phase discontinuity. Thus, the clock processing means may act as a phase shifting means shifting the phase of the input clock signal by e.g. any angle over a 360 degree range without phase discontinuity.

Furthermore, the clock processing means may programmably change the phase of the common clock signal by a certain phase amount being adjustable by e.g. a means for providing information indicating the phase amount, e.g. a value of the phase amount. For example, the means may vary a setting of the clock processing means in small increments, e.g. 0.1 degree, over at least one full turn.

According to an aspect, the device for controlling the state synchronizes the first and the second processing unit on the basis of the first and the second clock signal provided by the device for providing the plurality of clock signals.

According to an aspect, the means for determining the synchronization error measures the synchronization error on the basis of the output signals of the first and second processing unit. For example, the synchronization error is measured by comparing the phases and/or frequencies and/or output times of the output signals of the respective processing units.

The invention further provides a method for synchronizing the states of several processing units operating with clock signals derived from a common clock signal. The method comprises receiving the common clock signal, providing a first output clock signal on the basis of the common clock signal and changing a phase of the common clock signal to provide a second clock signal. The synchronization error is determined by comparing the state of the first processing unit and the state of the second processing unit. The result is fed back to a control input of the clock processing means.

Preferably the clock processing means is controlled in a manner that the clock rate of second output clock signal is increased or decreased until the second output clock signal is synchronized to the first output clock signal.

Alternatively, the clock processing means is controlled to insert and/or remove cycles from the common clock signal in order to generate the second output signal.

Further preferably, the clock processing means is controlled to shift the phase of the common clock signal by an angle of more than 360° without phase discontinuity.

Further preferably, the clock processing means shifts the phase of the common clock signal in small increments over a range of at least 360°.

According to an aspect, the method comprises continuously changing the phase of the common clock signal to provide the second clock signal having a different frequency than the common clock signal.

According to an aspect, the method comprises programmably shifting the phase of the common clock signal within a range between 0 degree and 360 degree.

According to an aspect, the method comprises bypassing the common clock signal to provide the first clock signal. According to an aspect, the method comprises changing a phase of the common clock signal or of a version thereof to provide the first clock signal.

According to an aspect, the method comprises changing the phase of the clock signal or of the version thereof in opposite directions to provide the first and the second clock signal, respectively.

According to the invention, state synchronization can be performed also at very high frequencies, where a distance between circuits is larger than the clock signal wavelength. Furthermore, a state synchrony is achievable without having to tolerate the effects of a random initial state relationship beyond the initial synchronization procedure. Thus, additional correction circuitry cancelling the effects of a state misalignment is not necessary which results in a reduced hardware complexity.

The inventive approach may easily be applied in a variety of devices, e.g. in the digitizing oscilloscope shown in FIG. 6. For example, the channel 1 may be chosen as a reference and a phase dial may be inserted in the clock path of the second channel ADC chip. At power-up, the counters within the ADC chips would start running from random initial states. The offset between counter values could be measured. Subsequently, the phase dial of channel 2 would be rotated by as many full turns as the two counters differ in value. Alternatively, the offset between counters could be monitored continuously while rotating the phase dial. Phase rotation would have to stop when the offset is zero.

Furthermore, a fractional turn of phase dial could be applied after counter state alignment in order to accurately calibrate the sampling times of the ADC in both channels at no additional hardware cost.

Compared to the prior art technique consisting of skipping clock cycles, the inventive approach has the following advantages:

The state of the circuit influenced by the phase dial can be shifted in either direction with respect to the reference circuit, whereas the clock-skipping technique can only delay the state of the circuit.

The phase of state updates can be fine-tuned without additional costs in the case of the phase dial approach. The clock-skipping technique can shift operation only in discrete steps of one clock cycle.

Compared to the prior art technique consisting of skipping states, the invention has the following advantages:

State skipping is possible only in circuits—such as counters—whose future states can be predicted ahead of time. When state transitions are dependent on input signals other than the clock, such prediction is generally not possible.

The option of skipping states must be implemented within the circuit to be synchronized—as opposed to inserting something in the clock path—which may represent considerable additional difficulty in the case of high-speed circuits.

The phase of state updates can be fine-tuned without additional costs in the case of the phase dial approach. The state-skipping technique can shift operation only in discrete steps of one clock cycle.

Compared to the prior art technique consisting of modifying the clock frequency for limited amount of time, the invention has the following advantage that the overall amount of phase shift is extremely well controlled using the phase dial approach down to a small fraction of a clock period. By contrast, the frequency-shift technique is limited by the accuracy of the time window during which the alternative clock frequency is applied, as well as the accuracy of the alternative frequency itself.

According to the invention, the state of the circuit influenced by the phase dial can be shifted by any number of clock cycles. By contrast, the variable-delay technique can produce only limited shifts—typically less than a clock cycle. Furthermore, a phase dial can be implemented on the basis of a single fixed-delay element with a delay of one quarter of a clock period while supporting an unlimited tuning range. The variable-delay technique requires a variable delay element with a tuning range of N clock periods to produce a shifting range limited to N clock cycles. Thus, even in applications where a limited tuning range would be acceptable, the phase dial approach will generally be less costly to implement.

BRIEF DESCRIPTION OF THE DRAWINGS

Further embodiments of the present invention will be described with respect to the accompanying figures, in which.

DETAILED DESCRIPTION OF EXEMPLARY EMBODIMENTS OF THE INVENTION

Figure 1:
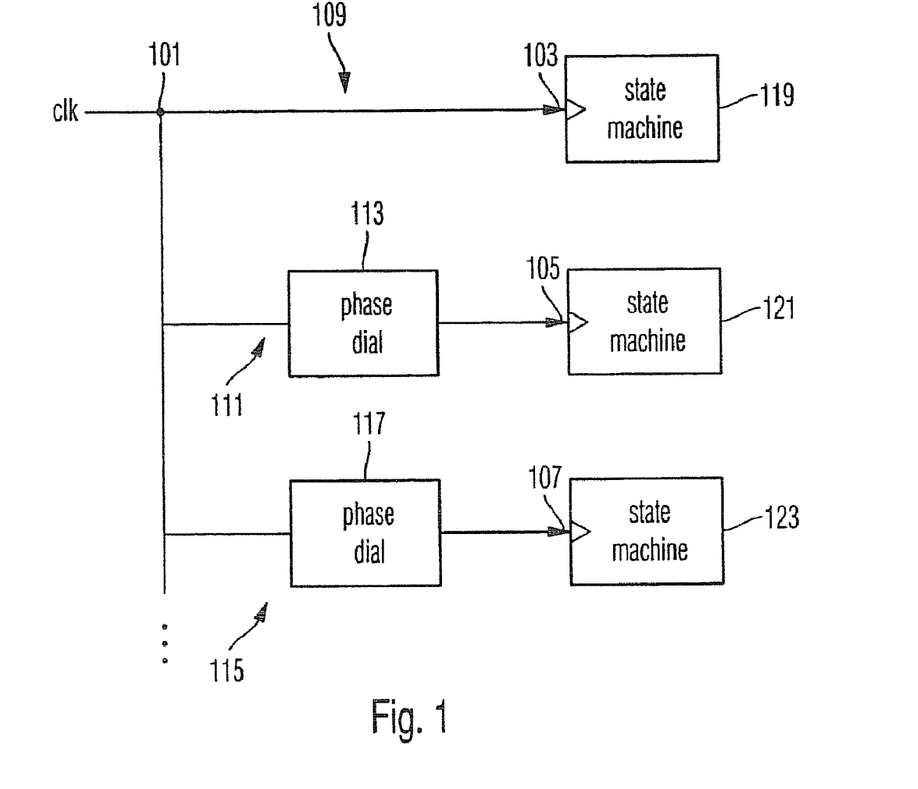
FIG. 1 shows a block diagram of a device for synchronizing the states of a plurality of sequential processing units.

The inventive approach may be used for synchronizing the states of multiple circuits running on a common clock signal, especially in applications where the distribution of a common reset signal to all circuits is not practical. The block diagram depicted in FIG. 1 depicts the case of three circuits as an example, but the approach generalizes to any number of circuits. After starting the circuits from random initial states, offsets between states are measured. One of the circuits can be chosen as a reference and the states of all other circuits can be shifted ahead or back with respect to the reference circuit by rotating the related phase dial over the number of full turns required to bring the error down to zero. Thus, it is possible to avoid providing a phase dial rotating a phase of a clock signal for the reference circuit. Thus, a calibration of the relative phases at which the circuits update their states can be achieved without additional hardware. Instead of rotating a phase dial by an integer number of turns, fractional turns can be applied in order to fine-tune the phase.

FIG. 1 shows by way of example a device for synchronizing the states of a plurality of sequential processing units comprising an input 101 for receiving a common clock signal (clk), a first output 103, a second output 105 and a third output 107. The notion of state makes most sense in the case of processing units having an internal memory. Technically, such units are qualified as sequential. The input 101 is coupled to the first output 103 via a first signal path 109 comprising e.g. a connecting wire. The input 101 is further coupled to the second output 105 via a second clock signal path 111 comprising a clock processing means 113. In addition, the input 101 is coupled to the third output 107 via a third clock signal path 115 comprising a clock processing means 117.

The clock processing means 113 may be formed as a phase dial or as a phase shifting circuit, by way of example.

The device shown in FIG. 1 may be arranged to provide the plurality of clock signals to a plurality of processing units. For example, the first output 103 may be connected to a clock input of a first processing unit 119, the second output 105 may be connected to a clock input of a second processing unit 121 and the third output 107 may be connected to a clock input of a third processing unit 123. The processing units 119, 121 and 123 respectively form, by way of example, state machines changing a respective state in response to a clock signal at the respective clock input. In FIG. 1, three processing units 119, 121, 123 are depicted by way of example only. However, the inventive approach may be applied to any number of processing units.

The phase shifting circuits 113 and 117 may be programmable over a 360° range (phase dial) in series with the clock inputs of all circuits to be synchronized, except one by way of example. When changing (e.g. tuning) the relative phases, one circuit may be chosen as a reference while the other circuit(s) are tuned relative to the reference circuit.

Furthermore, a phase dial (e.g. a clock processing means) may also be arranged in the first clock signal path 109.

According to an aspect, a phase dial may provide a quasi-continuous phase shift over the entire 360° range without a "wrap-around" a discontinuity at any point. For example, any change in the phase setting during the operation may be carried out quasi-continuously in a number of processing steps so that the circuits 119, 121, 123, keep operating properly. The maximum phase step per clock cycle may e.g. depend on the timing margins in the circuits. For example, phase steps of few degrees per clock cycle are acceptable in most applications.

In order to explain the inventive approach in more detail, the case of two identical circuits (e.g. 121 and 123) having the function of a binary counter is considered. It is further assumed that the phase dial 117 associated with the second circuit 123 be initially set to 0° and that the initial state of the counters 121 and 123 is identical. As long as the phase dial setting remains the same, both circuits will count at exactly the same pace. Hence, their states will remain in synchrony. It is obvious that the relative timing of state transitions in the two counters can be affected by rotating the phase dial. Depending on the direction of the phase shift, the second counter can e.g. increment its state earlier or later than the first counter. Hence, the phase dials 113 or 117 could be used to cancel delay mismatches within the clock distribution network to improve e.g. the state synchrony.

According to an aspect, the relative states of the two counters mentioned above can be shifted not just by a fraction of a cycle but by any amount, including many clock cycles if desired, by rotating the phase dial quasi-continuously over the corresponding number of turns or a fraction thereof. Starting from a 0°-setting, it is by way of example assumed that the phase dial is rotated by a 360°/N-step at each clock cycle, where N is e.g. 256. It is further assumed that the counter circuit 121 or 123 has enough timing margin to keep operating properly despite these phase steps. After N cycles of the input clock, the phase dial 113 or 117 is rotated (i.e. the phase is rotated) by 360°. Over this time frame, the first counter 121 experiences N clock cycles whereas the second counter 123 experiences N+1 cycles or N−1 cycles depending in which direction the phase dial 117 was rotated. Thus, N cycles result from the input clock signal whereas one cycle results from turning the phase dial. Consequently, the state of the second counter 123 is offset by one (state) unit compared to the state of the first counter 121. The relative states of the two counters can be shifted by any number of units by turning the dial 113 or 117 a corresponding number of times. It is not necessary that all phase steps have equal size or that the steps are executed at regular time intervals or any other predetermined temporal pattern. The decisive parameters may e.g. be formed by the initial and final phase settings, by the net number of turns applied in between and/or by the constraint that the progress from the initial to the final state is performed successively (quasi-continuously).

In the case of e.g. a sinusoidal clock signal, the clock waveform at the input of the second counter 121 can be expressed as follows:

$$V_{clk}(t) = A \cdot \cos(2\pi \cdot f_{clk} \cdot t + \phi). \tag{1}$$

A is the amplitude, $f_{clk}$ the input clock frequency and $\phi$ the setting of the phase dial. As long as $\phi$ remains constant, both counters run at the same frequency and remain in synchrony.

Thus, the clock signal at the output of the phase dial is identical to the input clock frequency $f_{clk}$.

If the phase setting φ is made to increase continuously at a constant rate in time, $$\phi(t) = \omega_{dial} \cdot t, \quad (2)$$

then the clock frequency provided to the second counter 123 changes according to the following formula:

$$V_{clk}(t) = A \cdot \cos((2\pi f_{clk} + \omega_{dial}) \cdot t). \quad (3)$$

Thereby, over some time interval, there will be more cycles in the output clock of the phase dial than in the input clock. By rotating the phase dial in the other direction, the clock frequency would be reduced, whereby the output clock would have fewer cycles than the input clock. If the respective phase dial covers the 360° range without "wrap-around" discontinuities then φ(t) can e.g. decrease over any amount of time, which implies that an unlimited number of clock cycles can be inserted or removed during circuit operation.

The above development suggests that the phase dial would actually constitute an implementation of the frequency shifting method mentioned above. Actually, the two methods are equivalent only if the phase setting is restricted to change at a constant rate. However, the inventive approach is not restricted to this particular case. The phase setting can e.g. be updated continuously or in discrete steps. Steps may vary in size and occur at variable time intervals. The only relevant parameters are the initial and final phase settings and the net number of 360° phase turns in between. Also, using a phase dial as a mean to modify the clock signal inherently enables very high accuracy in controlling the overall amount of phase shift. These features differentiate the invention from prior art methods consisting of shifting the clock frequency of selected circuits.

Figure 2:
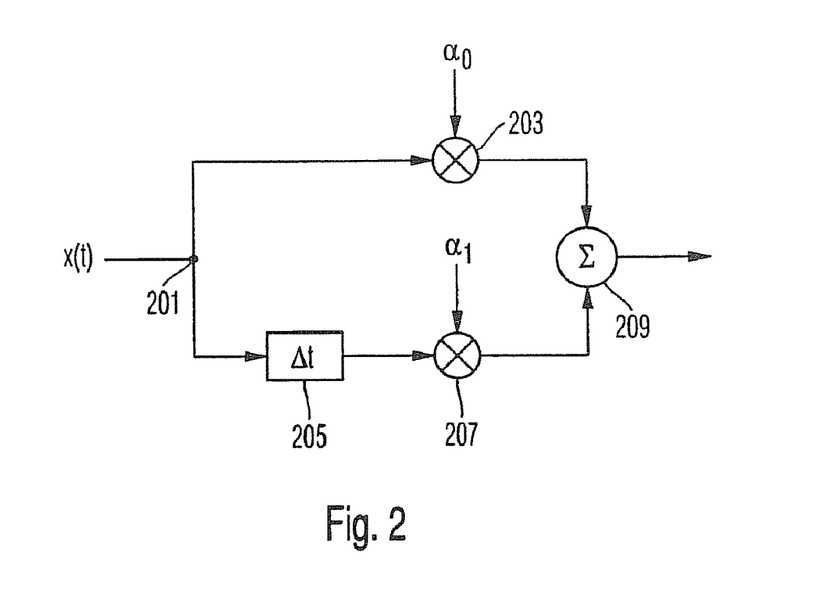
FIG. 2 shows a structure of a clock processing means.

FIG. 2 shows a clock processing means comprising an input 201, a first multiplier 203, a delay element 205 and a second multiplier 207. The first multiplier 203 is coupled between the input 201 and a first input of an adder 209. The second multiplier 207 is coupled between the input 201 and a second input of the adder 209. The adder 207 comprises an output for providing the clock signal.

Figure 3A:
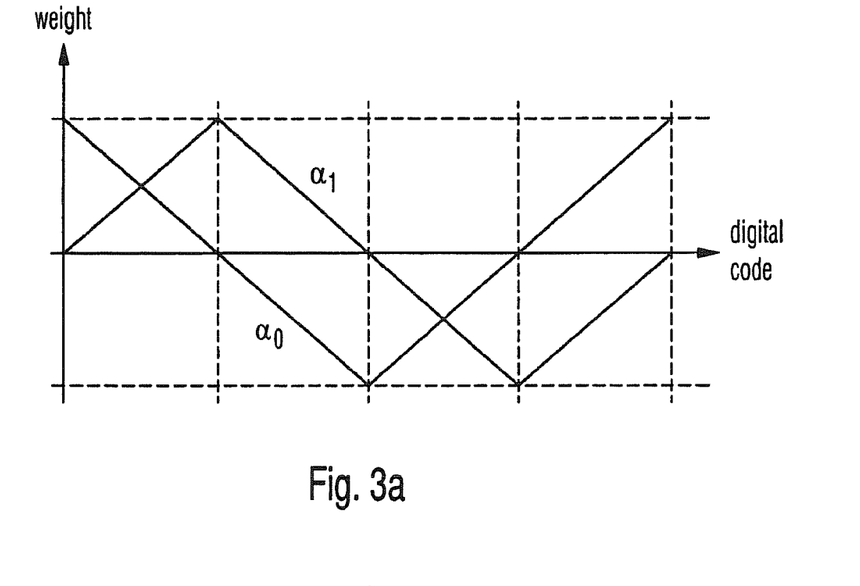
FIGS. 3a and 3b show phase changes.

As shown in FIG. 2, a sinusoidal input clock signal x(t) is applied to the multipliers 203 and 207. In one case, the signal is delayed by a constant time Δt prior to reaching the multiplier 205. The delay may be e.g. equal to one quarter of the period of the clock signal, but a small deviation from this value is tolerable. The multiplier coefficients $\alpha_0$ and $\alpha_1$ are functions of a digital word P specifying the desired phase setting shown in FIG. 3a depicting a relationship between control setting and weighting coefficients $\alpha_0$ and $\alpha_1$.

Figure 3B:
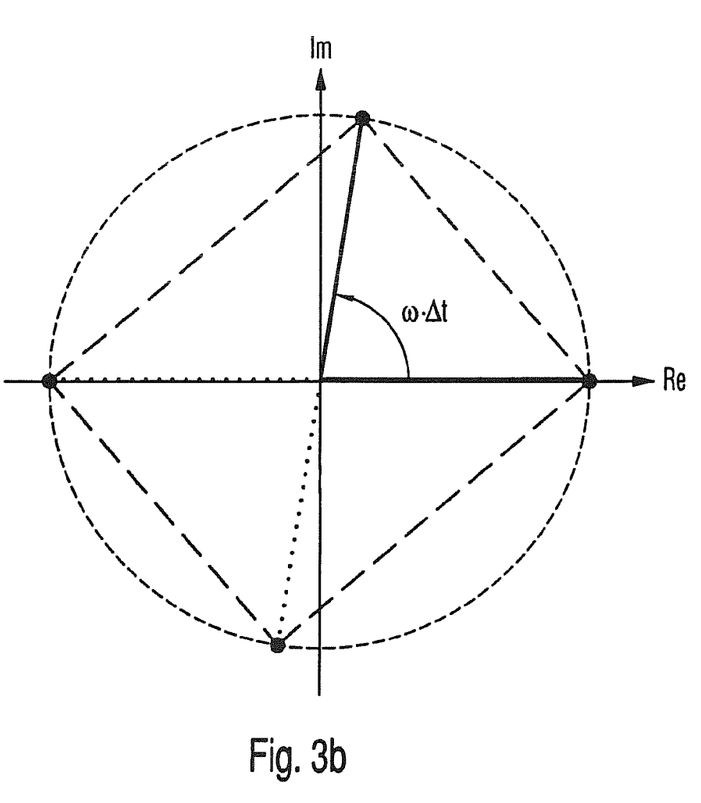

The relationship between P and the coefficients α0 and α1 may be continuous even at the point where the code range wraps around from the highest value back to the lowest value. If this condition is satisfied then the phase of the output signal will vary smoothly when P is incremented even if P wraps around from the last value back to the first value. The output signal is the sum of the multiplier outputs. If $\alpha_0$ is unity and $\alpha_1$ is zero then the output signal is essentially non-delayed with respect to the input, which corresponds to a phase shift of 0°. If $\alpha_0$ is zero and $\alpha_1$ is unity then the output is delayed by Δt with respect to the input, which corresponds to a phase shift of 90° if Δt is e.g. equal to a quarter a clock period. Intermediate settings will produce intermediate phases. By flipping the polarity of either or both weighting coefficients, phase shifts over the full 360° range can be produced. The phase rotation is depicted in FIG. 3b depicting a location of the achievable output phasors in the complex plane.

Figure 4:
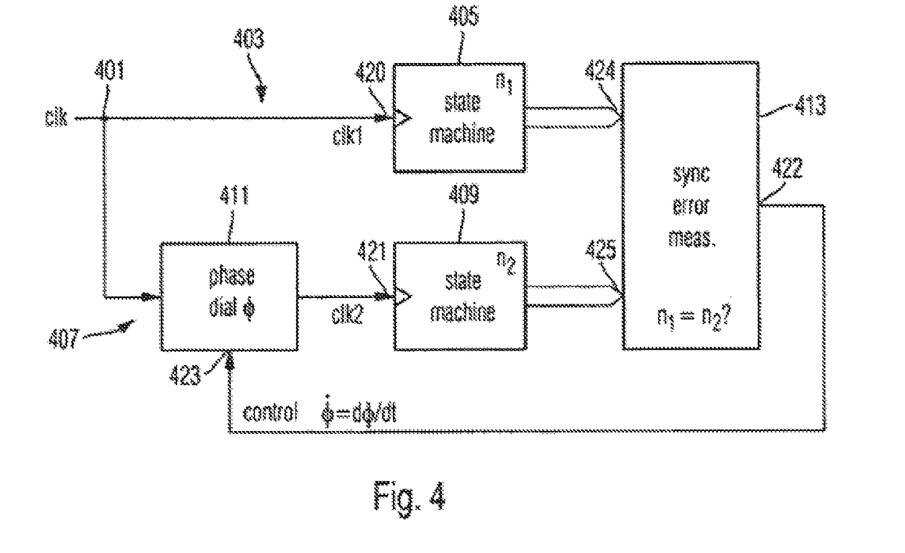
FIG. 4 shows a block diagram of a device for controlling states of processing units.

FIG. 4 shows a block diagram of a device for controlling states of processing units (circuits) whose states are to be synchronized. The device comprises an input 401 for receiving a common clock signal, a first signal path 403 coupling (e.g. electrically connecting) the input 401 with a clock input of a first processing unit 405 and a second signal path 407 coupling the input 401 with a clock input of a second processing unit 409. The second signal path 407 comprises a clock processing means 411. The device further comprises a means 413 for determining a synchronization error which receives an output signal of the first processing unit 405 via a first input and an output signal of the second processing unit 409 via a second input. An output of the means 413 for determining the synchronization error is fed back to a control input of the clock processing means 411. For example, the means 413 for determining the synchronization error measures the synchronization error and feedbacks the same to the control input of the clock processing means 411 (e.g. a phase dial).

According to an aspect, the processing units 405 and 409 are external elements. According to another aspect, the processing units 405 and 409 are internal elements of the device for controlling the states.

In the particular case where the phase is rotated at a constant rate from the initial to the final position, a shift of the clock frequency for a limited time is introduced. There would be alternative ways to produce a controlled frequency shift with respect to a reference clock, such as mixing the reference clock with an offset frequency signal and filtering appropriately. An advantage of the inventive phase change approach is that the overall phase excursion is inherently precisely controlled.

The inventive method for synchronizing the state machines 405 and 409 shown in FIG. 4 can be described as follows: Starting the state machines 405 and 409, the internal states of the state machines are completely unsynchronized. The two state machines do not know anything about the state of the other state machine. Also the state of the two state machines can be different. In a specific embodiment the two state machines 405, 409 comprise counters, which start with a different counter state when the power of the state machines is switched on. In order to synchronize the state machines 405, 409 it is necessary that the counters of the state machines get into a state where they have the same count state or count value and where the counters are incremented or decremented at exactly the same time when the same trigger event, e.g. clock edge, arises at both state machines. The count number or a count value is indicated as $n_1$ for state machine 405 and as $n_2$ for state machine 409 within FIG. 4.

It is the concept of the present invention that external clock input 420 of the first state machine 405 and/or external clock input 421 of the second state machine 409 are controlled in a manner that the internal state of the state machines is synchronized. In the example that the state machines 405, 409 comprise counters, the two state machines 405, 409 receive different clock signals at the clock inputs 420, 421 so that the count value of the counter that has a lower count value at the starting point the state machines is increased until both count values are equal ($n_1 = n_2$) or in a matter that the count value of the counter that has a higher value at starting point of the state machines is decreased. This is achieved by the clock processing means 411 providing the clock signal clk2 for the second state machine 409.

As can be seen from FIG. 4 the first clock signal clk1 for the first state machine 405 and the second clock signal clk2 for the second state machine 409 are generated from the same common clock signal clk. In the embodiment of FIG. 4 common clock signal clk is bypassed to clock input 420 of the first state machine 405 in a matter that the first clock signal clk1 received by the first state machine 405 is identical with the common clock signal clk. In order to provide a second clock signal clk2 for the second state machine 409, however, the common clock signal clk is processed by clock processing means 411 which can be realized as a phase dial. The phase dial shifts the phase of the common clock signal clk in the manner as described with respective FIGS. 3a and 3b in order to provide the second clock signal clk2.

Assuming the example where the state machines 405 and 409 comprise counters and further assuming that when starting the state machines 405, 409, the counter of the second state machine 409 has a higher count value $n_2$ with respect to the count value $n_1$ of the first state machine 405, the clock rate of the second clock signal clk2 provided to the second state machine 409 is decreased so that the rate of trigger events, e.g. clock edges, updating the count value of the counter of the second state machine 409 is lower compared to the rate of trigger events produced by the first clock signal clk1, which updates, e.g. increases, the counter of the first state machine 405. This results in slower increasing the count value $n_2$ of the second state machine 409 with respect to the count value $n_1$ of the first state machine 405. This difference between the clock rates of the first clock signal clk1 and the second clock signal clk2 is maintained until the count values $n_1$ and $n_2$ are equalized. When the two count values $n_1$ and $n_2$ are equalized there will be made a fine-tuning resulting in the fact that the triggering part, for example falling and/or rising edge (active edge), of the clock signals clk1 and clk2 are exactly synchronized in time so that there is no phase difference between these signals.

In order to synchronize both state machines 405, 409, means are provided for determining the synchronization error 413. The determining means 413 continuously checks the states and phases of changes of the states of the state machines 405, 409. In the example where the state machines 405, 409 comprise counters the determining means 413 checks the count value $n_1$ of the first state machine 405 and count value $n_2$ of a second state machine 409. The determining means 403 also checks the time where the count value is increased or decreased. For this purpose the determining means 413 receive the state $n_2$ of a first state machine 405 at its first input 424 and of a state $n_2$ of the second state machine 409 at its second input 425. The output 422 of determining means 413 is fed back to a control input 423 of the clock processing means 411.

The control signal might comprise a signal $\dot{\Phi}=d\Phi/dt$. The control signal $\dot{\Phi}$ is positive when a continuous increase of the phase of the second clock signal clk2 is to be achieved. The control signal $\dot{\Phi}$ is negative when a continuous decrease of the clock signal clk2 is to be achieved by the phase processing means 411. By this feedback loop a very effective control of the clock signal clk2 provided to one of the state machines 409 is achieved which guarantees very effective synchronization of the two state machines.

Of course, the clock processing means 411 can also be provided in front of the clock input 420 of the first state machine 405. It might be most effective to have two clock processing means, one provided in front of the clock input 420 of the first state machine 405 and one provided in front of the clock input 421 of the second state machine 409.

The invention provides a simple concept for modifying a relationship between the states of different circuits in operation. In addition, an error between the actual and the desired state relationship can be measured by e.g. the means for determining the error so that a magnitude and sign of the phase correction can be determined either in a single operation or iteratively as depicted in FIG. 4. The methods for measuring the state synchrony error (synchronization error) may be e.g. application-dependent. Furthermore, the feedback control of the phase dials may be performed on a basis of the methods used for a posteriori correcting the effect of synchrony errors.

The invention claimed is:

1. A system for synchronizing the states of several processing units comprising:
   an input for receiving a common clock signal;
   a first clock signal path for providing a first output clock signal derived from the common clock signal to a first processing unit;
   a second clock signal path for providing a second output clock signal to a second processing unit, the second clock signal path comprising a clock processing means for rotating a phase of the common clock signal to provide the second output clock signal having a different frequency than the common clock signal; and
   means for determining a synchronization error between the states of the processing units, which receives an output signal of the first processing unit via a first input and an output signal of the second processing unit via a second input,
   wherein an output of the means for determining the synchronization error is fed back to a control input of the clock processing means.

2. The system according to claim 1,
   wherein the clock processing means is able to shift the phase of the common clock signal over an angle of more than 360° without discontinuity or in such small discrete increments that the second sequential processing unit keeps operating properly while the phase is rotated in order to generate the second output clock signal.

3. The system according to claim 1,
   wherein the means for determining a synchronization error controls the clock processing means in such a manner to insert or remove cycles from the common clock signal in order to provide the second output clock signal until the state of the second processing unit is synchronized with the state of the first processing unit, and
   wherein a clock cycle is inserted or removed by rotating the phase angle between the common clock signal and the second output clock signal over a 360° full turn continuously or in such small discrete increments that the second processing unit keeps operating properly while the phase is rotated.

4. The system according to claim 1,
   wherein the means for determining a synchronization error controls the clock processing means in a manner to increase or decrease the frequency of the second output clock signal with respect to the common clock signal until the state of the second processing unit is synchronized with the state of the first processing unit.

5. The system according to claim 1,
   wherein the processing units are sequential processing units, which have an internal memory.

6. The system according to claim 1,
   wherein a control signal fed back from the output of the means for determining the synchronization error to the control input of the clock processing means controls the clock processing means in a manner that the clock processing means shifts the phase of the common clock signal in small increments over a range of at least 360° in order to generate the second output clock signal.

7. The system according to claim 1,
wherein the clock processing means being configured to successively change the phase of the common clock signal by a predetermined phase amount in a plurality of processing steps, and
wherein the clock processing means being configured to output a clock signal as the second clock signal in each processing step.

8. The system according to claim 1,
wherein the clock processing means being configured to programmably change the phase of the common clock signal by a certain phase amount, the system further comprising a means for providing information indicating the phase amount to the clock processing means.

9. The system according to claim 1,
wherein the clock processing means being configured to continuously change the phase of the common clock signal to provide the second clock signal having a different frequency than the common clock signal.

10. The system according to claim 1,
wherein the first clock signal path bypassing the common clock signal to provide the first clock signal.

11. The system according to claim 1,
wherein the first clock signal path comprising a further clock processing means for changing a phase of the common clock signal or of a version thereof to provide the first clock signal.

12. The system according to claim 11,
wherein the clock processing means and the further clock processing means being configured to change the phase of the clock signal or of the version thereof in opposite directions.

13. The system according to claim 1,
wherein the clock processing means being configured to change the phase on the basis of at least one multiplication.

14. The system according to claim 13, wherein the clock processing means comprises:
a first multiplier coupled to the input of the clock processing means and provided with a first multiplier coefficient for multiplying the input signal with the first multiplier coefficient,
a delay element coupled to the input of the clock processing means for delaying the input signal by a specific amount of delay,
a second multiplier coupled to the output of the delay element and provided with a second multiplier coefficient for multiplying the output signal of the delay element with the second multiplier coefficients, and
an adder for adding the output signal of the first multiplier and the output signal of the second multiplier.

15. A method for synchronizing the states of several processing units operating with clock signals derived from a common clock signal, the method comprising the steps:
receiving the common clock signal;
providing a first clock signal to a first processing unit on the basis of the common clock signal;
providing a second clock signal having a different frequency than the common clock signal to a second processing unit by rotating a phase of the common clock signal in a clock processing unit means,
determining a synchronization error by comparing the state of the first processing unit with the state of the second processing unit; and
feeding a result of the determination of the synchronization error back to a control input of the clock processing unit.

16. The method according to claim 15,
wherein the determination of the synchronization error controls the clock processing unit in a manner that the clock rate and/or frequency of the second output clock signal is increased or decreased until the second output clock signal is synchronized to the first output clock signal.

17. The method according to claim 15,
wherein the means for determining a synchronization error controls the clock processing unit in a manner to insert or remove cycles from the common clock signal in order to provide the second output clock signal until the state of the second sequential processing unit is synchronized with the state of the first sequential processing unit, and
wherein a clock cycle is inserted or removed by rotating the phase angle between the common clock signal and the second output clock signal over a 360° full turn continuously or in such small discrete increments that the second sequential processing unit keeps operating properly while the phase is rotated.

18. The method according to claim 15,
wherein the processing units are sequential processing units, which have an internal memory.

19. The method according to claim 15,
wherein the clock processing unit is controlled to shift the phase of the common clock signal by an angle of more than 360° without phase discontinuity in order to generate the second output clock signal.

20. The method according to claim 15,
wherein a control signal is fed back from the output of the means for determining the synchronization error to the control input of the clock processing unit in order to control the clock processing unit in a manner that the clock processing unit shifts the phase of the common clock signal in small increments over a range of at least 360° in order to generate the second output clock signal.

21. The method according to claim 15,
wherein the clock processing unit successively changes the phase of the common clock signal by a predetermined phase amount in a plurality of processing steps and
wherein the clock processing unit outputs a clock signal as the second clock signal in each processing step.

22. The method according to claim 15,
wherein the clock processing unit programmably changes the phase of the common clock signal by a certain phase amount, and
wherein information indicating the phase amount is provided to the clock processing unit.

23. The method according to claim 15,
wherein the clock processing unit continuously changes the phase of the common clock signal to provide the second clock signal having a different frequency than the common clock signal.

24. The method according to claim 15,
wherein bypassing the common clock signal to provide the first clock signal.

25. The method according to claim 15,
wherein changing a phase of the common clock signal or of a version thereof in a further clock processing unit to provide the first clock signal.

26. The method according to claim 25,
wherein the clock processing unit and the further clock processing unit change the phase of the clock signal or of the version thereof in opposite directions.

27. The method according to claim 15,
wherein each clock processing unit changes the phase on the basis of at least one multiplication.

28. The method according to claim 27, further comprising:

multiplying the input signal of the clock processing unit with the first multiplier coefficient in a first multiplier, delaying the input signal by a specific amount of delay in a delay element, multiplying the output signal of the delay element with the second multiplier coefficient in a second multiplier and adding the output signal of the first multiplier and the output signal of the second multiplier.

* * * * *